(12) United States Patent
Bunazawa et al.

(10) Patent No.: US 11,421,781 B2
(45) Date of Patent: Aug. 23, 2022

(54) OIL PRESSURE LEARNING METHOD OF AUTOMATIC TRANSMISSION, CONTROL DEVICE THEREOF, AND CONTROL SYSTEM THEREOF

(71) Applicant: TOYOTA JIDOSHA KABUSHIKI KAISHA, Toyota (JP)

(72) Inventors: Hideaki Bunazawa, Nagoya (JP); Atsushi Tabata, Okazaki (JP); Koichi Okuda, Toyota (JP); Ken Imamura, Toyota (JP); Kota Fujii, Nissin (JP); Keita Sasaki, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/359,738

(22) Filed: Jun. 28, 2021

(65) Prior Publication Data
US 2022/0018433 A1    Jan. 20, 2022

(30) Foreign Application Priority Data

Jul. 17, 2020   (JP) .............................. JP2020-122833

(51) Int. Cl.
*F16H 61/30*    (2006.01)
*F16H 59/42*    (2006.01)
(Continued)

(52) U.S. Cl.
CPC ............. *F16H 61/30* (2013.01); *F16H 59/42* (2013.01); *F16H 61/08* (2013.01); *F16H 59/18* (2013.01)

(58) Field of Classification Search
CPC .......... F16H 61/30; F16H 61/08; F16H 59/42; F16H 59/18
See application file for complete search history.

(56) References Cited

U.S. PATENT DOCUMENTS

| 4,283,970 A | 8/1981 | Vukovich |
| 5,029,086 A | 7/1991 | Yoshimura |
| 5,741,203 A | 4/1998 | Nishio |

FOREIGN PATENT DOCUMENTS

| DE | 68926540 T2 | 10/1996 |
| JP | 2008-025624 A | 2/2008 |

OTHER PUBLICATIONS

Reinforcement Learning for Hybrid and Plug in Hybrid Vehicle Energy Management; journal published Sep. 24, 2019; Author: Hu et al; IEEE Industrial electronics magazine; vol. 1932-4529; pp. 18-24. (Year: 2022).*

(Continued)

*Primary Examiner* — Tisha D Lewis
(74) *Attorney, Agent, or Firm* — Oliff PLC

(57) ABSTRACT

An oil pressure learning method of an automatic transmission includes acquiring a state of a vehicle in a state where relational regulation data is stored, supplying oil to the automatic transmission such that the value of the oil pressure is set to an oil pressure command value, calculating, as a specific variable, a variable representing an amount in which a detected input rotation speed exceeds a target input rotation speed, or the like, calculating a reward in a manner in which it has a larger value when the specific variable satisfies a criterion than when it does not satisfy the criterion, updating the relational regulation data by inputting, to an update mapping, the reward and the oil pressure command value, and calculating a torque variable having a value that is increased as an amount of change in an input torque is increased.

9 Claims, 8 Drawing Sheets

(51) Int. Cl.
  *F16H 59/14* (2006.01)
  *F16H 61/08* (2006.01)
  *F16H 59/18* (2006.01)

(56) References Cited

OTHER PUBLICATIONS

Reinforcement Learning Based Power Management for Hybrid Electric Vehicles; journal published 2014; Author; Lin et al; IEEE; vol. 978-1-4799-6278; pp. 34-35. (Year: 2022).*

Energy Management Strategy for a Hybrid Electric Vehicle Based on Deep Reinforcement Learning; journal published Jan. 26, 2018; Author; Hu et al; Applied Sciences; pp. 5-9. (Year: 2022).*

* cited by examiner

OIL PRESSURE LEARNING METHOD OF AUTOMATIC TRANSMISSION, CONTROL DEVICE THEREOF, AND CONTROL SYSTEM THEREOF

CROSS-REFERENCE TO RELATED APPLICATION

This application claims priority to Japanese Patent Application No. 2020-122833 filed on Jul. 17, 2020, incorporated herein by reference in its entirety.

BACKGROUND

1. Technical Field

The present disclosure relates to an oil pressure learning method, a control device, and a control system of an automatic transmission.

2. Description of Related Art

In a vehicle described in Japanese Unexamined Patent Application Publication No. 2008-025624 (JP 2008-025624 A), an automatic transmission is connected to a power source. Upon receiving a request to switch gear stages from a control device of a vehicle, the automatic transmission switches the gear stages by engaging or releasing a predetermined clutch or brake.

Then, when switching the gear stages, the control device of the vehicle controls feedback such that an amount in which a detected input rotation speed of the automatic transmission exceeds a target input rotation speed of the automatic transmission for an oil pressure when the predetermined clutch or brake is engaged, that is, a so-called blow amount, is decreased.

SUMMARY

According to a technology disclosed in JP 2008-025624 A, when wearing-out is generated in the clutch or brake of the automatic transmission over time and its characteristics are changed, the oil pressure is adjusted such that the blow amount of the input rotation speed of the automatic transmission is decreased accordingly. However, the blow amount of the input rotation speed of the automatic transmission is not influenced only by the changes in the characteristics of the automatic transmission. For this reason, when the oil pressure of the clutch or the like of the automatic transmission is only adjusted simply based on the blow amount of the input rotation speed of the automatic transmission, there is a probability that an oil pressure cannot be appropriately adjusted according to the change in the characteristics of the automatic transmission.

A first aspect of the present disclosure is an oil pressure learning method of an automatic transmission. The automatic transmission is mounted on a vehicle, is connected to a power source of the vehicle, and includes at least one of a brake and a clutch as a friction engaging element. The oil pressure learning method includes a step of acquiring a state of the vehicle in a state where a storage device stores relational regulation data used for regulating a relationship between the state of the vehicle and an oil pressure command value, which is a pressure of oil supplied to the automatic transmission when the friction engaging element that switches gear stages of the automatic transmission is engaged, a step of supplying, when the friction engaging element that switches the gear stages of the automatic transmission is engaged, oil to the automatic transmission such that the value of the pressure of the supplied oil is set to the oil pressure command value determined by the acquired state of the vehicle and the relational regulation data, a step of calculating, when the friction engaging element is engaged, as a specific variable, at least one of a variable representing an amount in which a detected input rotation speed of the automatic transmission exceeds a target input rotation speed of the automatic transmission, a variable representing a gear-shift time from a start of the switching of the gear stages to a completion of the switching, and a variable representing an amount of heat generated in the automatic transmission, a step of calculating a reward in a manner in which the reward has a larger value when the acquired specific variable satisfies a criterion than when the acquired specific variable does not satisfy the criterion, a step of updating the relational regulation data by inputting, to an update mapping determined in advance, the calculated reward and the oil pressure command value, the reward being calculated when the friction engaging element is engaged, and a step of calculating a torque variable having a value that is increased as an amount of change in an input torque of the automatic transmission is increased when the friction engaging element is engaged. The update mapping outputs the relational regulation data that is updated to increase an expected profit for the reward when the friction engaging element is engaged according to the relational regulation data. When the amount of change in the input torque represented by the calculated torque variable is equal to or greater than a predetermined value that is determined in advance, a change in the relational regulation data is regulated, the amount of change in the input torque being calculated when the friction engaging element is engaged.

In the first aspect, when the torque variable is less than the predetermined value, the reward may be corrected to have a smaller value as the torque variable is increased.

With the above configuration, the reward is calculated to be smaller when the amount of change in the input torque is large than when the amount of change in the input torque is small. For this reason, in a situation where the influence on the specific variable is small, the change in the relational regulation data by the learning is small, and in a situation where the influence on the specific variable is large, the change in the relational regulation data by the learning is also large.

In the first aspect, the update mapping may include a mapping that updates only an action value function by an updated amount having a value obtained by multiplying an action value function before the updating by a learning rate. When the torque variable is equal to or greater than the predetermined value, the relational regulation data is updated with the learning rate set to "0".

With the above configuration, when the amount of change in the input torque is equal to or greater than the predetermined value, the learning rate is set to "0". Thus, the relational regulation data is not changed before and after the learning. As a result, when the state of the vehicle is the same, the oil pressure command value derived from the relational regulation data and the state of the vehicle is not changed. As such, by implementing the process that does not change the relational regulation data by a numerical value of the learning rate, it is possible to restrict the process from being greatly changed depending on the magnitude of the amount of change in the input torque, thereby contributing to a simplification of a series of learning processes.

In the first aspect, a different reward may be assigned for each kind of switching of the gear stages of the automatic transmission.

With the above configuration, the calculated reward varies depending on the type of switching of the gear stages of the automatic transmission. For this reason, different relational regulation data is learned depending on the type of switching of the gear stages. Therefore, it is more likely that an appropriate oil pressure command value can be obtained for each type of switching of the gear stages.

In the first aspect, the torque variable may be a difference between an accelerator operation amount, which is an operation amount of an accelerator pedal at the start of the switching of the gear stages, and the accelerator operation amount of the accelerator pedal at the completion of the switching of the gear stages.

With the above configuration, the torque variable can be detected by the accelerator operation amounts at the start of the gear-shift of the automatic transmission and at the completion of the gear-shift.

In the first aspect, the torque variable may be a difference between a maximum value and a minimum value of the accelerator operation amount, which is an operation amount of an accelerator pedal during the gear-shift time from the start of the switching of the gear stages to the completion of the switching.

With the above configuration, the torque variable can be detected by the maximum value and the minimum value of the accelerator operation amount during the gear-shift period of the automatic transmission. For this reason, even when the accelerator operation amount is changed from increasing to decreasing or from decreasing to increasing during the gear-shift period, the maximum amount of change in the accelerator operation amount can be calculated as the torque variable.

In the first aspect, the torque variable may have a value obtained by dividing, into the gear-shift time, a difference between an accelerator operation amount, which is an operation amount of an accelerator pedal at the start of the switching of the gear stages, and the accelerator operation amount at the completion of the switching of the gear stages.

With the above configuration, the torque variable can have different values depending on whether the gear-shift time is long or short even when the difference in the accelerator operation amount is the same. In other words, the torque variable can be calculated as a rate of change in the accelerator operation amount per hour.

A second aspect of the present disclosure is a control device of an automatic transmission. The automatic transmission is mounted on a vehicle, is connected to a power source of the vehicle, and includes at least one of a brake and a clutch as a friction engaging element. The control device of the automatic transmission includes a storage device and an execution device. The storage device is configured to store relational regulation data used for regulating a relationship between a state of the vehicle and an oil pressure command value, which is a pressure of oil supplied to the automatic transmission when the friction engaging element that switches gear stages of the automatic transmission is engaged. The execution device is configured to acquire the state of the vehicle, supply, when the friction engaging element that switches the gear stages of the automatic transmission is engaged, oil to the automatic transmission such that the value of the pressure of the supplied oil is set to the oil pressure command value determined by the acquired state of the vehicle and the relational regulation data, calculate, when the friction engaging element is engaged, as a specific variable, at least one of a variable representing an amount in which a detected input rotation speed of the automatic transmission exceeds a target input rotation speed of the automatic transmission, a variable representing a gear-shift time from a start of switching of the gear stages to a completion of the switching, and a variable representing an amount of heat generated in the automatic transmission, calculate a reward in a manner in which the reward has a larger value when the acquired specific variable satisfies a criterion than when the acquired specific variable does not satisfy the criterion, update the relational regulation data by inputting, to an update mapping determined in advance, the calculated reward and the oil pressure command value, the reward being calculated when the friction engaging element is engaged, and calculate a torque variable having a value that is increased as an amount of change in an input torque of the automatic transmission is increased when the friction engaging element is engaged. The update mapping outputs the relational regulation data that is updated to increase an expected profit for the reward when the friction engaging element is engaged according to the relational regulation data. The execution device regulates, when the amount of change in the input torque represented by the calculated torque variable is equal to or greater than a predetermined value that is determined in advance, a change in the relational regulation data, the amount of change in the input torque being calculated when the friction engaging element is engaged.

A third aspect of the present disclosure is a control system of an automatic transmission. The automatic transmission is mounted on a vehicle, is connected to a power source of the vehicle, and includes at least one of a brake and a clutch as a friction engaging element. The control system of the automatic transmission includes a storage device, a first execution device mounted on the vehicle, and a second execution device, which is separate from the first execution device. The storage device is configured to store relational regulation data used for regulating a relationship between the state of the vehicle and an oil pressure command value, which is a pressure of oil supplied to the automatic transmission when the friction engaging element that switches gear stages of the automatic transmission is engaged. The first execution device is configured to acquire a state of the vehicle and supply, when the friction engaging element that switches the gear stages of the automatic transmission is engaged, oil to the automatic transmission such that the value of the pressure of the supplied oil is set to the oil pressure command value determined by the acquired state of the vehicle and the relational regulation data. At least one of the first execution device and the second execution device is configured to calculate, when the friction engaging element is engaged, as a specific variable, at least one of a variable representing an amount in which a detected input rotation speed of the automatic transmission exceeds a target input rotation speed of the automatic transmission, a variable representing a gear-shift time from a start of switching of the gear stages to a completion of the switching, and a variable representing an amount of heat generated in the automatic transmission and calculate a reward in a manner in which the reward has a larger value when the acquired specific variable satisfies a criterion than when the acquired specific variable does not satisfy the criterion. The second execution device is configured to update the relational regulation data by inputting, to an update mapping determined in advance, the calculated reward and the oil pressure command value, the reward being calculated when the friction engaging element is engaged. At least one of the first execution device and the second execution device is configured to calculate a torque variable having a value that is increased as an amount of change in an input torque of the automatic transmission is increased when the friction engaging element is engaged. The update mapping outputs the relational regulation data that is updated to increase an expected profit for the reward when the friction engaging element is engaged according to the relational regulation data. The second execution device is configured to, when the amount of change in the input torque represented by the calculated torque variable is equal to or greater than a predetermined value that is determined in advance, regulates a change in the relational regulation data, the amount of change in the input torque being calculated at the time when the friction engaging element is engaged.

When the input torque of the automatic transmission is changed while the gear stages of the automatic transmission are being switched, a specific variable, such as the blow amount, the gear-shift time, or the amount of heat generated is also changed. For this reason, when the amount of change in the input torque is large, the specific variable may be more influenced by the amount of change in the input torque than by the oil pressure command value.

With each aspect of the present disclosure, when the oil pressure command value, which is a pressure of the oil supplied to the automatic transmission when the gear stages of the automatic transmission are switched, is learned by reinforcement learning, the relational regulation data is not changed in a case where the amount of change in the input torque is equal to or greater than a predetermined value that is determined in advance. For this reason, in a situation where the specific variable may be influenced regardless of the oil pressure command value, the learning based on the specific variable does not greatly change the oil pressure command value.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

First Embodiment

Figure 1:
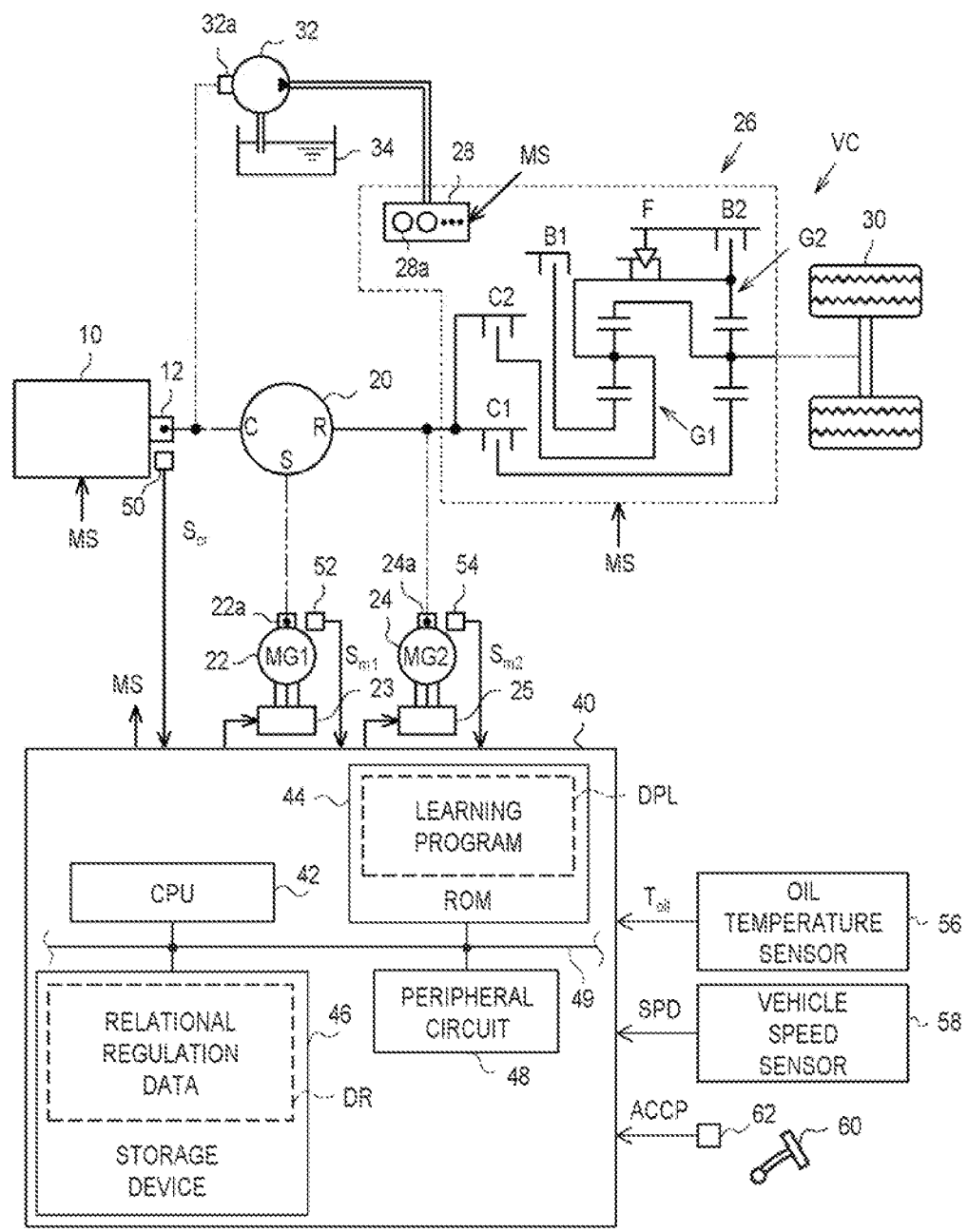
FIG. 1 is a diagram illustrating a vehicle and its control device according to a first embodiment.

As illustrated in FIG. 1, an internal combustion engine 10 is mounted on a vehicle VC. A power split device 20 is mechanically connected to a crankshaft 12 of the internal combustion engine 10. The power split device 20 divides power of the internal combustion engine 10, a first motor generator 22, and a second motor generator 24. The power split device 20 includes a planetary gear mechanism having a carrier C, a sun gear S, and a ring gear R. The crankshaft 12 of the power split device 20 is mechanically connected to the carrier C of the planetary gear mechanism, a rotation shaft 22a of the first motor generator 22 is mechanically connected to the sun gear S of the power split device 20, and a rotation shaft 24a of the second motor generator 24 is mechanically connected to the ring gear R of the power split device 20. An output voltage of a first inverter 23 is applied to terminals of the first motor generator 22. Further, an output voltage of a second inverter 25 is applied to terminals of the second motor generator 24.

In addition to the rotation shaft 24a of the second motor generator 24, driving wheels 30 are mechanically connected to the ring gear R of the power split device 20 via an automatic transmission 26. Detailed description is omitted, but the automatic transmission 26 includes a first planetary gear mechanism G1, a second planetary gear mechanism G2, a first clutch C1, a second clutch C2, a first brake B1, a second brake B2, a one-way clutch F, and an oil pressure control circuit 28. Switching between engagement and releasement of the first clutch C1, the second clutch C2, the first brake B1, and the second brake B2 is executed by hydraulic oil from the oil pressure control circuit 28. Further, the gear stages of the automatic transmission 26 are changed by changing a combination of engagement/releasement of the first clutch C1, the second clutch C2, the first brake B1, and the second brake B2. In the automatic transmission 26, the first clutch C1, the second clutch C2, the first brake B1, and the second brake B2 function as friction engaging elements.

Further, a driven shaft 32a of an oil pump 32 is mechanically connected to the carrier C of the power split device 20. The oil pump 32 takes in oil in an oil pan 34 and discharges the oil as hydraulic oil to the automatic transmission 26. The hydraulic oil discharged from the oil pump 32 is used by adjusting the pressure by the oil pressure control circuit 28 in the automatic transmission 26. The oil pressure control circuit 28 includes a plurality of solenoid valves 28a and controls a flow state or the oil pressure of the hydraulic oil by energizing each of the solenoid valves 28a.

The control device 40 has the internal combustion engine 10 as a control target and operates various operation units of the internal combustion engine 10 in order to control torque, an exhaust component ratio, or the like, which is a control amount thereof. Further, the control device 40 has the first motor generator 22 as a control target and operates the first inverter 23 in order to control torque, rotation speed, or the like, which is a control amount thereof. Further, the control device 40 has the second motor generator 24 as a control target and operates the second inverter 25 in order to control torque, rotation speed, or the like, which is a control amount thereof. Further, the control device 40 has the automatic transmission 26 as a control target and operates the solenoid valve 28a in order to engage the friction engaging element of the automatic transmission 26. In the drawings, a signal sent by the control device 40 in order to operate the internal combustion engine 10 or the automatic transmission 26 is illustrated as an operation signal MS.

When controlling the control amount, the control device 40 refers to an output signal $S_{cr}$ of a crank angle sensor 50, and an output signal $S_{m1}$ of a first rotation angle sensor 52 that detects a rotation angle of the rotation shaft 22a of the first motor generator 22, or an output signal $S_{m2}$ of a second rotation angle sensor 54 that detects a rotation angle of the rotation shaft 24a of the second motor generator 24. Further, the control device 40 refers to an oil temperature $T_{oil}$, which is the temperature of oil detected by an oil temperature sensor 56, a vehicle speed SPD detected by a vehicle speed sensor 58, or an accelerator operation amount ACCP, which is a depression amount of an accelerator pedal 60 detected by an accelerator sensor 62.

The control device 40 includes a CPU 42, a ROM 44, a storage device 46 that is an electrically rewritable non-volatile memory, and a peripheral circuit 48. They can communicate with each other via internal buses 49. Here, examples of the peripheral circuit 48 include a circuit that generates a clock signal regulating an internal operation, a power supply circuit, or a reset circuit. The control device 40 controls the control amount when the CPU 42 executes a program stored in the ROM 44.

Figure 2:
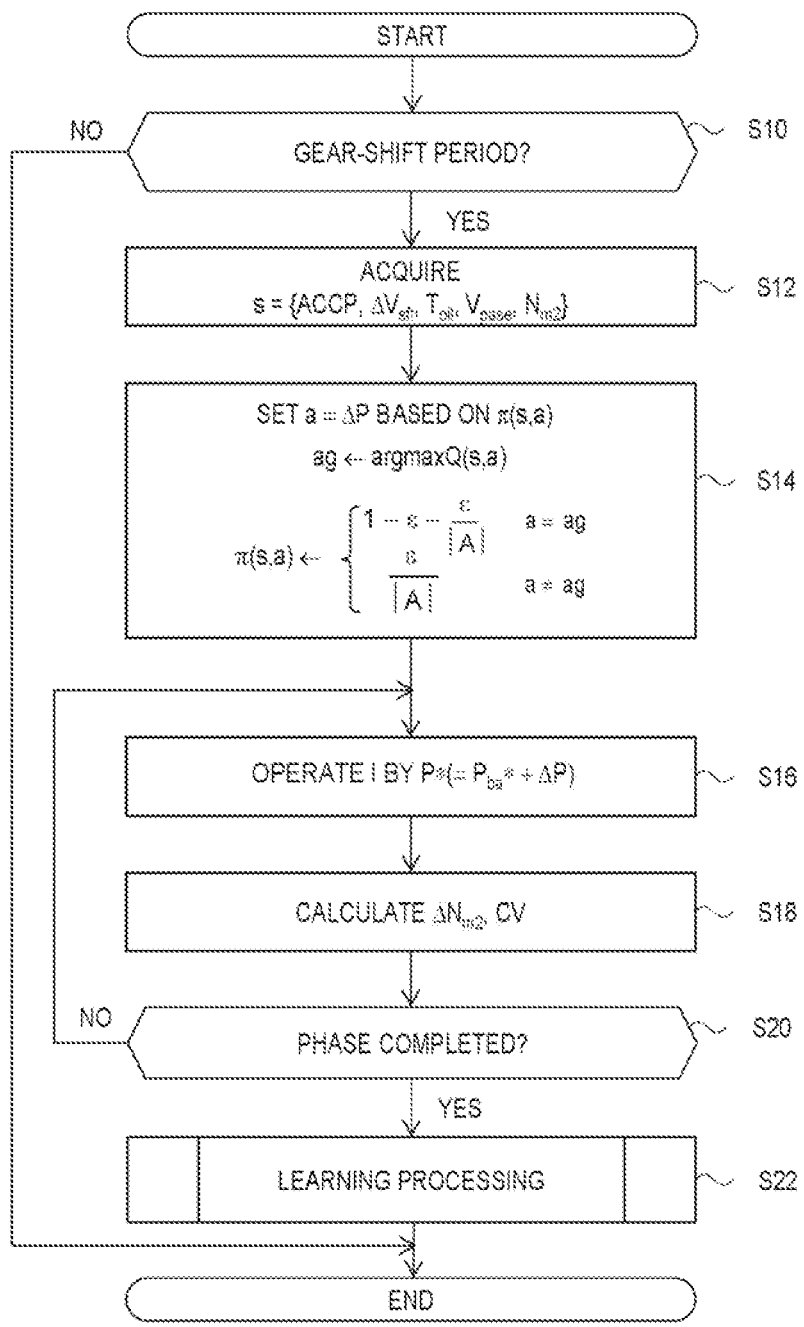
FIG. 2 is a flowchart illustrating a procedure of processing executed by the control device according to the embodiment.

FIG. 2 illustrates a procedure of processing executed by the control device 40. The processing illustrated in FIG. 2 is implemented when the CPU 42 repeatedly executes a learning program DPL stored in the ROM 44 at, for example, a predetermined cycle. In other words, the CPU 42 executes the learning usage of the oil pressure of the automatic transmission 26 according to a learning program DPL. Hereinbelow, a step number of each process is represented by a number prefixed with "S".

In a series of processes illustrated in FIG. 2, the CPU 42 first determines whether it is a gear-shift period from the start of switching of the gear stages to the completion of the switching, that is, whether it is a gear-shift period of the automatic transmission 26 (S10). Upon determining that it is the gear-shift period (S10: YES), the CPU 42 acquires the accelerator operation amount ACCP as a state s of the vehicle VC, a gear-shift variable $\Delta V_{sft}$, the oil temperature $T_{oil}$, a phase variable $V_{pase}$, and a detected rotation speed $N_{m2}$ of the second motor generator 24 (S12). Here, the gear-shift variable $\Delta V_{sft}$ specifies the gear stages before and after the switching, for example, whether the gear is being shifted from first gear to second gear, or from second gear to first gear. In other words, it is a variable that specifies the type of switching of the gear stages. Further, the phase variable $V_{pase}$ is a variable that specifies which of three phases determining a stage of the gear-shift during the gear-shift period corresponds to.

In other words, in the first embodiment, the gear-shift period is divided into Phase 1, Phase 2, and Phase 3. Here, Phase 1 is a period from the start of switching of the gear stages until a predetermined time passes. Phase 2 is a period from the end of Phase 1 to the end of a torque phase. In other words, it is the period from the end of Phase 1 until torque transmissibility of the friction engaging element, which is switched from the engaged state to the released state by switching the gear stages, becomes zero. The CPU 42 determines an end point of Phase 2 based on a difference between an actual rotation speed of the input shaft and a rotation speed of the input shaft of the automatic transmission 26 determined by the rotation speed of the output shaft of the automatic transmission 26 and the gear ratio before switching the gear stages. The rotation speed of the input shaft is the detected rotation speed $N_{m2}$. Further, the CPU 42 calculates the rotation speed of the output shaft of the automatic transmission 26 according to the vehicle speed SPD. Phase 3 is a period from the end of Phase 2 to the completion of the switching of the gear stages. In other words, it is a period from the end of Phase 2 to the completion of the gear-shift of the automatic transmission 26. That is, the CPU 42 calculates the detected rotation speed $N_{m2}$ based on the output signal $S_{m2}$.

The state s is a value of a variable of which the relationship with an action variable is regulated by relational regulation data DR stored in the storage device 46 illustrated in FIG. 1. Here, in the first embodiment, as the action variable, a correction value $\Delta P$ of an oil pressure command value $P^*$, which is a pressure of oil supplied to the automatic transmission 26 in order to drive the friction engaging element when switching the gear stages, is exemplified.

More specifically, the oil pressure command value $P^*$ is constant in Phase 1 and Phase 2. The oil pressure command value $P^*$ is increased at a constant speed in Phase 3.

The oil pressure command value $P^*$ is calculated by adding the correction value $\Delta P$ to a base value $P_{ba}^*$. The base value $P_{ba}^*$ is implemented when the CPU 42 map-calculates the base value $P_{ba}^*$ in a state where the ROM 44 stores, in advance, map data that has the accelerator operation amount ACCP, the gear-shift variable $\Delta V_{sft}$, and the oil temperature $T_{oil}$ as input variables and the base value $P_{ba}^*$ as an output variable.

Then, the relational regulation data DR includes an action value function Q. The action value function Q has the state s and an action a as independent variables and an expected profit for the state s and the action a as a dependent variable. In the first embodiment, the action value function Q is a table-type function.

Next, the CPU 42 calculates a value of the action variable, that is, the correction value $\Delta P$ of the oil pressure command value $P^*$ based on a policy $\pi$ regulated by the relational regulation data DR (S14). In the first embodiment, an ε-greedy policy is exemplified as the policy. In other words, a policy is exemplified in which when the state s is granted, a rule for preferentially selecting an action that maximizes the action value function Q (hereinafter referred to as a greedy action ag) from among the action value functions Q in which the independent variable becomes the given state s while selecting the other actions with a predetermined probability is determined. Specifically, when the total number of values that can be taken by an action is expressed by |A|, probabilities of taking actions other than the greedy action are expressed by ε/|A|, respectively.

In addition, in the first embodiment, in consideration of the fact that the action value function Q is table-type data, the state s as the independent variable has a certain width. In other words, for example, when the action value function Q is defined at 10% intervals for the accelerator operation amount ACCP, a case where the accelerator operation amount ACCP is "3%" and a case where the accelerator operation amount ACCP is "6%" do not become different states s from each other only based on the fact that the cases have different values.

Next, the CPU 42 calculates the oil pressure command value $P^*$ by adding the base value $P_{ba}^*$ to the correction value $\Delta P$ and operates an energizing current I of the solenoid valve 28a such that the energizing current I becomes a value that is determined based on the oil pressure command value P* (S16). Then, the CPU 42 calculates the blow amount $\Delta N_{m2}$ and the heat generation amount CV (S18).

The blow amount $\Delta N_{m2}$ is a quantified amount of blow-up of the rotation speed of the input shaft of the automatic transmission 26 during the gear-shift period, and is calculated as an amount in which the detected rotation speed $N_{m2}$, which is calculated from the output signal Sm2 of the second rotation angle sensor 54, exceeds a target rotation speed $N_{m2}$* as a reference determined in advance. Here, the CPU 42 sets the target rotation speed $N_{m2}$* as the reference according to the accelerator operation amount ACCP, the vehicle speed SPD, and the gear-shift variable $\Delta V_{sft}$. This process can be implemented when the CPU 42 map-calculates the target rotation speed $N_{m2}$* as the reference in a state where the ROM 44 stores, in advance, the map data that has the accelerator operation amount ACCP, the vehicle speed SPD, and the gear-shift variable $\Delta V_{sft}$ as the input variables and the target rotation speed $N_{m2}$* as the reference as the output variable. The map data is a set of data of discrete values of input variables and values of output variables respectively corresponding to the values of the input variables. Further, in the map calculation, for example, when a value of an input variable matches any of the values of the input variable of the map data, the value of the corresponding output variable of the map data is used as a calculation result, whereas when a value of an input variable does not match any of the values of the input variables of the map data, the value obtained by interpolating the values of a plurality of output variables included in the map data is used as the calculation result.

On the other hand, in the first embodiment, the heat generation amount CV is calculated as an amount proportional to the product of a rotational speed difference between a pair of the friction engaging elements and the torque applied to them when switching from one of the two states of the released state and the engaged state to the other. More specifically, the CPU 42 calculates the heat generation amount CV based on the detected rotation speed $N_{m2}$ as the rotation speed of the input shaft of the automatic transmission 26, the rotation speed of the output shaft of the automatic transmission 26 grasped from the vehicle speed SPD, and the torque grasped from the accelerator operation amount ACCP. Specifically, the CPU 42 map-calculates the heat generation amount CV in a state where the ROM 44 stores, in advance, the map data that has the rotation speed of the input shaft, the rotation speed of the output shaft, and the accelerator operation amount ACCP as the input variables and the heat generation amount CV as the output variable.

The CPU 42 executes the processes of S16 and S18 until the current phase is completed (S20: NO). Then, upon determining that the current phase is completed (S20: YES), the CPU 42 updates the relational regulation data DR by the reinforcement learning (S22). Upon completing the process of S22 or making a negative determination in the process of S10, the CPU 42 temporarily ends the series of processes illustrated in FIG. 2.

Figure 3:
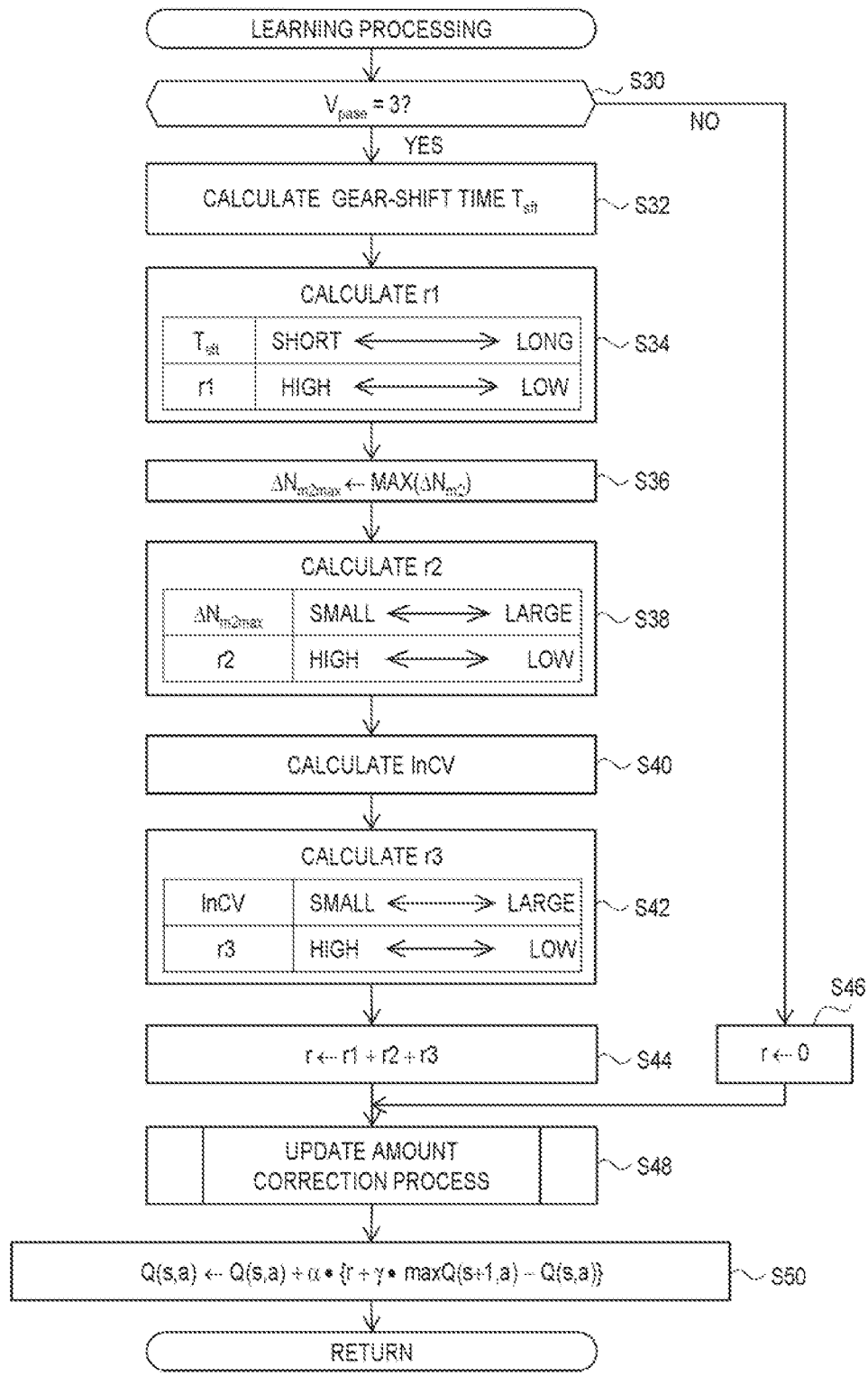
FIG. 3 is a flowchart illustrating a detailed procedure of a part of the processing executed by the control device according to the embodiment.

FIG. 3 illustrates details of the process of S22. In a series of processes illustrated in FIG. 3, the CPU 42 first determines whether the phase variable $V_{pase}$ is "3" (S30). Then, upon determining that the variable is "3" (S30: YES), since the gear-shift has been completed, the CPU 42 calculates the gear-shift time $T_{sft}$, which is the time required for the gear-shift (S32). Specifically, the gear-shift time $T_{sft}$ is a period from the start of control for switching the gear stages until a ratio of the detected rotation speed $N_{m2}$ as the rotation speed of the input shaft of the automatic transmission 26 to the rotation speed of the output shaft of the automatic transmission 26 grasped from the vehicle speed SPD matches a gear ratio at a gear stage after the gear-shift, and a certain period elapses. Then, the CPU 42 calculates a reward r1 according to the gear-shift time $T_{sft}$ (S34). More specifically, the CPU 42 calculates the reward r1 to be a value higher when the gear-shift time $T_{sft}$ is short than when it is long.

Next, the CPU 42 enters the maximum value of the blow amount $\Delta N_{m2}$ from among the blow amounts $\Delta N_{m2}$ repeatedly calculated at a predetermined cycle by the process of S18 into the blow amount maximum value $\Delta N_{m2max}$ (S36). Next, the CPU 42 calculates a reward r2 according to the maximum blow amount $\Delta N_{m2max}$ (S38). More specifically, the CPU 42 calculates the value of the reward r2 to be higher when the maximum blow amount $\Delta N_{m2max}$ is small than when it is large.

Next, the CPU 42 calculates the heat generation amount InCV, which is an integrated value of the heat generation amount CV repeatedly calculated at a predetermined cycle by the process of S18 (S40). Next, the CPU 42 calculates a reward r3 according to the heat generation amount InCV (S42). More specifically, the CPU 42 calculates the value of the reward r3 to be higher when the heat generation amount InCV is small than when it is large.

Then, the CPU 42 enters a sum of the reward r1, the reward r2, and the reward r3 into the reward r for the action used in the process of S16 (S44). On the other hand, upon determining whether the phase variable $V_{pase}$ is "1" or "2" (S30: NO), the CPU 42 enters "0" into the reward r (S46).

Upon completing the processes of S44 and S46, the CPU 42 corrects an update amount by executing an update amount correction process (S48). Details of the update amount correction process will be described below. Upon completing the process of S48, the CPU 42 updates, based on the reward r and a learning rate α to which the update amount correction process has been executed, the action value function Q(s,a) used in the process of S14 (S50). The action value function Q(s,a) used in the process of S14 is an action value function Q(s,a) that has the state s acquired by the process of S12 and the action a set by the process of S14 as independent variables.

In the first embodiment, the action value function Q(s,a) is updated by so-called Q-learning, which is a policy-off type TD method. Specifically, the action value function Q(s,a) is updated by the following equation (c1):

$$Q(s,a) \leftarrow Q + \alpha \cdot \{r + \gamma \cdot \max Q(s+1, a) - Q(s,a)\} \qquad (c1)$$

Here, a discount rate γ and a learning rate α are used in an update amount "α·{r+γ·maxQ(s+1, a)−Q(s, a)}" of the action value function Q(s,a). The discount rate γ is a constant greater than "0" and equal to or less than "1". Further, when the current phase is Phase 1 or Phase 2, "maxQ(s+1, a)" means the action value function having the maximum value from among the action value functions Q that have a state variable at the time of the completion of the phase, that is, a state s+1 to be acquired by a process of S12 after the series of processes illustrated in FIG. 2 as an independent variable. Unless the current phase is Phase 3, the state s acquired by the process of S12 after the series of processes illustrated in FIG. 2 is the state s+1 used by the process of S50. Further, when the current phase is Phase 3, the state s acquired by the process of S12 of this time of the series of processes illustrated in FIG. 2 is set as the state s+1.

Upon completing the process of S50, the CPU 42 temporarily ends the series of processes illustrated in FIG. 3. In addition, the relational regulation data DR at the time of shipment of the vehicle VC is data that has been learned by the same processing as that of FIG. 2 in a prototype vehicle having the same specifications as those of the vehicle VC. In other words, the processing of FIG. 2 is used for updating, by the reinforcement learning, the correction value ΔP of the base value $P_{ba}*$ and the correction value ΔP set before the shipment of the vehicle VC to an appropriate value when the vehicle VC actually travels on the road.

Figure 4:
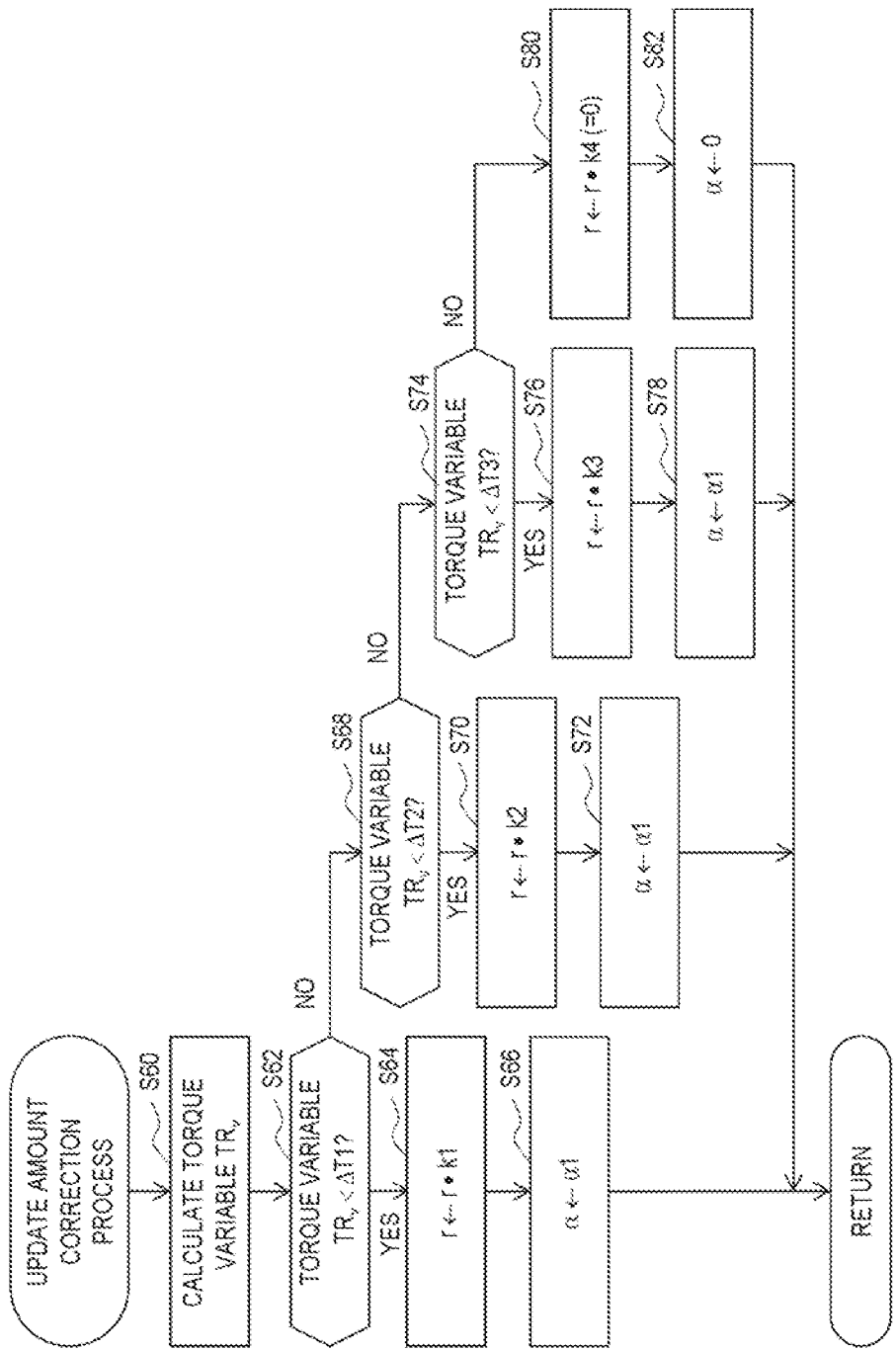
FIG. 4 is a flowchart illustrating a detailed procedure of another part of the processing executed by the control device according to the embodiment.

Next, the update amount correction process will be described. Specifically, the reward r and a learning rate α are set. As illustrated in FIG. 4, first, the CPU 42 calculates a torque variable $TR_v$ as a variable representing an amount of change in the input torque of the automatic transmission 26 during an engagement process (S60). In the first embodiment, the torque variable $TR_v$ is calculated as an absolute value of the difference between the accelerator operation amount ACCP at the start of the switching of the gear stages and the accelerator operation amount ACCP at the completion of the switching of the gear stages. For this reason, the larger the absolute value of the difference between these accelerator operation amounts ACCP becomes, the larger the torque variable $TR_v$ is calculated to be.

Next, the CPU 42 determines whether the torque variable $TR_v$ is less than a first predetermined value ΔT1 determined in advance (S62). When the torque variable $TR_v$ is less than the first predetermined value ΔT1 (S62: YES), the CPU 42 sets the reward r to a value obtained by multiplying the reward r calculated in S44 or S46 by a first correction coefficient k1 determined in advance (S64). In the first embodiment, the first correction coefficient k1 is set to "1". Further, the CPU 42 sets the learning rate α as a learning rate α1 determined in advance (S66). The learning rate α1 is set to a value greater than "0" and smaller than "1".

On the other hand, when the torque variable $TR_v$ is equal to or greater than the first predetermined value ΔT1 (S62: NO), the CPU 42 determines whether the torque variable $TR_v$ is less than a second predetermined value ΔT2 determined in advance (S68). The second predetermined value ΔT2 is set to a value greater than the first predetermined value ΔT1. When the torque variable $TR_v$ is less than the second predetermined value ΔT2 (S68: YES), the CPU 42 sets the reward r to a value obtained by multiplying the reward r calculated in S44 or S46 by a second correction coefficient k2 determined in advance (S70). The second correction coefficient k2 is set to a value smaller than the first correction coefficient k1 and greater than "0". Further, the CPU 42 sets the learning rate α as the learning rate α1 determined in advance (S72). The learning rate α1 set here has the same value as that of the learning rate α1 set in step S66.

On the other hand, when the torque variable $TR_v$ is equal to or greater than the second predetermined value ΔT2 (S68: NO), the CPU 42 determines whether the torque variable $TR_v$ is less than a third predetermined value ΔT3 determined in advance (S74). The third predetermined value ΔT3 is set to a value greater than the second predetermined value ΔT2. When the torque variable $TR_v$ is less than the third predetermined value ΔT3 (S74: YES), the CPU 42 sets the reward r to a value obtained by multiplying the reward r calculated in S44 or S46 by a third correction coefficient k3 determined in advance (S76). The third correction coefficient k3 is set to a value smaller than the second correction coefficient k2 and greater than "0". Further, the CPU 42 sets the learning rate α as the learning rate α1 determined in advance (S78). The learning rate α1 set here has the same value as that of the learning rate α1 set in step S66.

On the other hand, when the torque variable $TR_v$ is equal to or greater than the third predetermined value ΔT3 (S74: NO), the CPU 42 sets the reward r to a value obtained by multiplying the reward r calculated in S44 or S46 by a fourth correction coefficient k4 determined in advance (S80). In the first embodiment, the fourth correction coefficient k4 is set to "0". For this reason, the reward r corrected by S80 becomes "0". Further, the CPU 42 sets the learning rate α to "0" (S82).

The third predetermined value ΔT3 is determined in advance by experiments and simulations. Specifically, the third predetermined value ΔT3 is set by comparing an influence of the amount of the change in the input torque on a specific variable, such as the blow amount $ΔN_{m2}$, the gear-shift time $T_{sft}$, or the heat generation amount InCV with an influence of the oil pressure command value P* on the specific variable. Then, the third predetermined value ΔT3 is set to a value by which the influence of the amount of the change in the input torque becomes more dominant than the influence of the oil pressure command value P*.

Further, the first predetermined value ΔT1 and the second predetermined value ΔT2 are set in advance so that the torque variable $TR_v$ can divide a range from "0" to the third predetermined value ΔT3 into three equal parts. For this reason, in the first embodiment, the first predetermined value ΔT1 is smaller than the second predetermined value ΔT2 and the third predetermined value ΔT3. Specifically, the first predetermined value ΔT1 is one third of the third predetermined value ΔT3. Further, the second predetermined value ΔT2 is smaller than the third predetermined value ΔT3. Specifically, the second predetermined value ΔT2 is two thirds of the third predetermined value ΔT3.

As described above, when the torque variable $TR_v$ is less than the third predetermined value ΔT3, the larger the torque variable $TR_v$ is, the smaller the correction coefficient is set. For this reason, when the torque variable $TR_v$ is less than the third predetermined value ΔT3, the larger the torque variable $TR_v$ is, the smaller the reward r is corrected to be.

Then, when the torque variable $TR_v$ is equal to or greater than the third predetermined value ΔT3, the action value function Q is updated without being changed by setting the learning rate α to "0" in the above-described update process of S50. Upon completing the processes of S66, S72, S78 and S82, the CPU 42 temporarily ends a series of processes illustrated in FIG. 4.

Here, an action and an advantageous effect of the first embodiment will be described. (1-1) According to the first embodiment, during the gear-shift period, the CPU 42 selects the greedy action ag, operates the energizing current of the solenoid valve 28a, and searches for the correction value ΔP in a better oil pressure command value P* using an action other than the greedy action with a predetermined probability. Then, the CPU 42 updates the action value function Q of the correction value ΔP used for determining the oil pressure command value P* by the Q-learning. As such, an appropriate oil pressure command value P* can be learned by the enforcement learning when the vehicle VC actually travels on the road.

(1-2) During the switching of the gear stages, when the input torque of the automatic transmission 26 is changed by the change of the accelerator operation amount ACCP, a specific variable, such as the blow amount $ΔN_{m2}$, the gear-shift time $T_{sft}$, or the heat generation amount InCV, is also changed. Then, when the amount of change in the input torque is large and the torque variable $TR_v$ is equal to or greater than the third predetermined value ΔT3, the influence of the amount of change in the input torque on the specific variable is larger than the influence of the oil pressure of the friction engaging element on the specific variable. According to the first embodiment, when the torque variable $TR_v$ is equal to or greater than the third predetermined value $\Delta T3$, the CPU 42 does not change the action value function Q. For this reason, in a situation where the specific variable may be influenced regardless of the oil pressure command value P*, the learning based on the specific variable does not greatly change the oil pressure command value P*.

(1-3) According to the first embodiment, when the torque variable $TR_v$ is less than the third predetermined value $\Delta T3$, the smaller the magnitude of the torque variable $TR_v$ is, the larger the magnitude of the correction coefficient multiplied by the reward r is. For this reason, when the torque variable $TR_v$ is less than the third predetermined value $\Delta T3$, the larger the amount of the change in the torque variable $TR_v$ is, the smaller the reward r is corrected to be. For this reason, in a situation where the influence on the specific variable is small, the update amount of the action value function Q by the learning becomes small, and in a situation where the influence on the specific variable is large, the update amount of the action value function Q by the learning becomes large.

(1-4) According to the first embodiment, when the torque variable $TR_v$ is equal to or greater than the third predetermined value $\Delta T3$ by the update amount correction process, the CPU 42 updates the action value function Q with the learning rate α set to "0". As such, when the torque variable $TR_v$ is equal to or greater than the third predetermined value $\Delta T3$, the CPU 42 executes the update process without changing the action value function Q. As a result, when the state of the vehicle s is the same, the oil pressure command value P* derived from the relational regulation data DR is not changed, either. As such, by implementing the process that does not change the action value function Q by a numerical value of the learning rate α, it is possible to restrict the process from being greatly changed depending on the magnitude of the amount of the change in the input torque, thereby contributing to a simplification of a series of the learning processing.

Second Embodiment

Hereinafter, a second embodiment will be described with reference to drawings, focusing on differences from the first embodiment.

Figure 5:
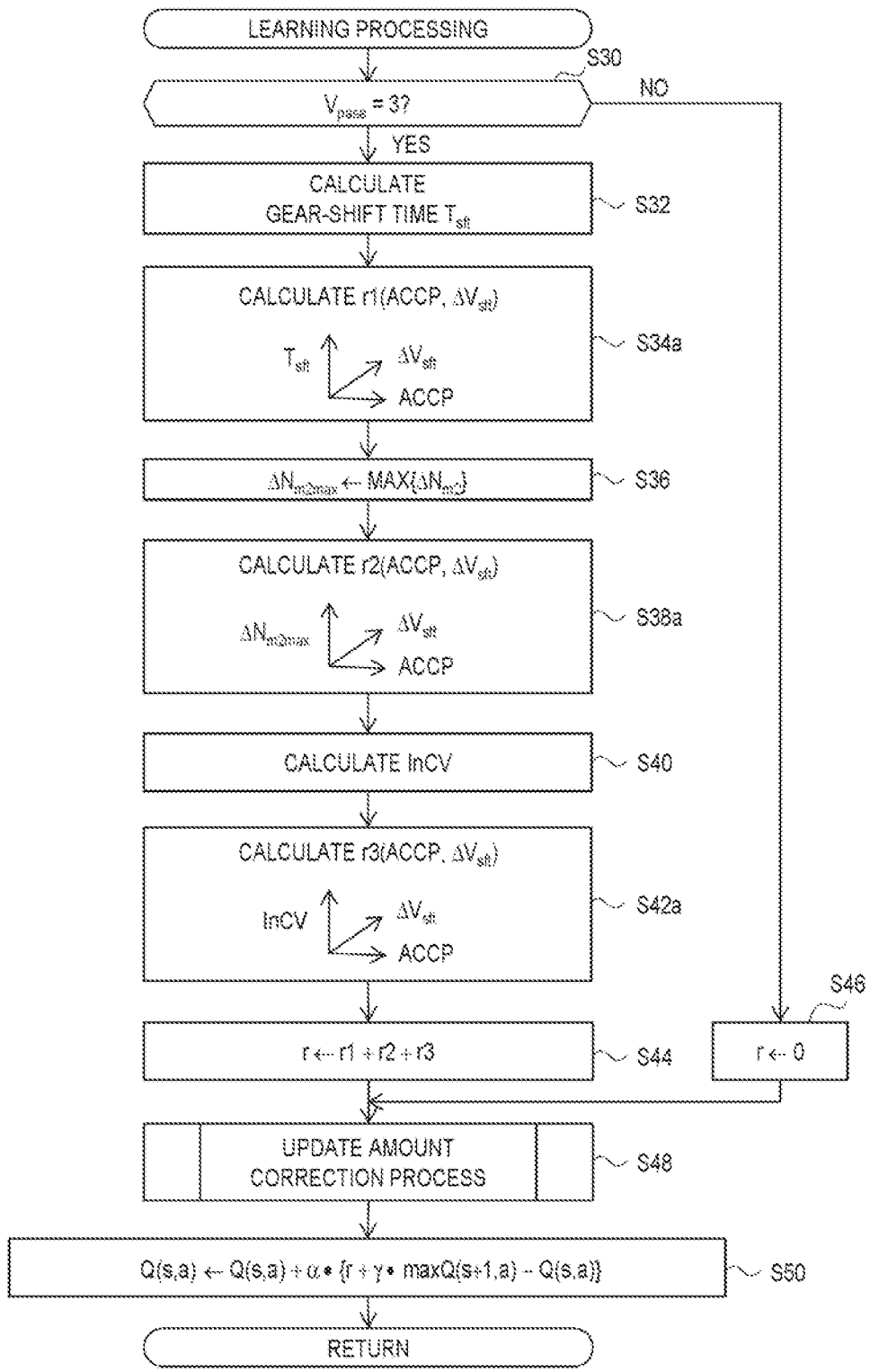
FIG. 5 is a flowchart illustrating a procedure of processing executed by the control device according to a second embodiment.

FIG. 5 illustrates a detailed procedure of the process of S22 according to the second embodiment. The processing illustrated in FIG. 5 is implemented when the CPU 42 repeatedly executes the learning program DPL stored in the ROM 44 at, for example, a predetermined cycle.

In a series of processes illustrated in FIG. 5, the CPU 42 uses the accelerator operation amount ACCP and the gear-shift variable $\Delta V_{sft}$ for a calculation process of the reward r1 according to the gear-shift time $T_{sft}$ (S34a), a calculation process of the reward r2 according to the maximum blow amount $\Delta N_{m2max}$ (S38a), or the calculation process of the reward r3 according to the heat generation amount InCV (S42a).

Next, an action and an advantageous effect of the second embodiment will be described. (2-1) According to the second embodiment, the rewards r1, r2, r3 are assigned according to the accelerator operation amount ACCP or the type of gear-shift for the following reasons.

First, it is a setting for learning the greedy action ag such that the priorities of three required elements, which are an accelerator response having a strong correlation with the gear-shift time $T_{sft}$, drivability having a strong correlation with the maximum blowing rate $\Delta N_{m2max}$, and the heat generation amount InCV, vary depending on the accelerator operation amount ACCP and the gear-shift variable $\Delta V_{sft}$.

In other words, for example, in a case where the priority of an accelerator response is higher when switching from second gear to first gear than when switching from first gear to second gear, the absolute value of the reward for the same gear-shift time $T_{sft}$ is set to be larger when switching from second gear to first gear than when switching from first gear to second gear. In that case, by, for example, increasing the priority of the heat generation amount InCV, the absolute value of the reward r3 for the same heat generation amount InCV is set to be larger when switching from first gear to second gear than when switching from second gear to first gear.

Second, since the torque or the rotation speed applied to the automatic transmission 26 varies depending on the accelerator operation amount ACCP or the type of gear-shift, values of the maximum blow amount $\Delta N_{m2max}$, the gear-shift time $T_{sft}$, and the heat generation amount InCV that can be taken vary depending on the accelerator operation amount ACCP and the type of gear-shift. For this reason, when the same reward r1 is uniformly assigned for the gear-shift time $T_{sft}$ or the like regardless of the accelerator operation amount ACCP or the type of gear-shift, the learning may become difficult.

As such, in the second embodiment, by changing the rewards r1, r2, r3 depending on the accelerator operation amount ACCP and the gear-shift variable $\Delta V_{sft}$, it is possible to execute the learning reflecting that the priorities of the gear-shift time $\Delta V_{sft}$, the blow amount $\Delta N_{m2}$, and the heat generation amount InCV vary depending on the accelerator operation amount ACCP or the type of gear-shift. Further, it is possible to assign the rewards r1 to r3 in consideration of the fact that the values of the maximum blow amount $\Delta N_{m2max}$, the gear-shift time $T_{sft}$, and the heat generation amount InCV that can be taken vary depending on the accelerator operation amount ACCP, and further, to smoothly proceed with the learning. In other words, the calculated reward r varies depending on the type of switching of the gear stages of the automatic transmission 26. For this reason, different relational regulation data DR is learned depending on the type of switching of the gear stages. Therefore, an appropriate oil pressure command value P* can be obtained for each type of switching of the gear stages.

Third Embodiment

Hereinafter, a third embodiment will be described with reference to drawings, focusing on differences from the first embodiment.

Figure 6:
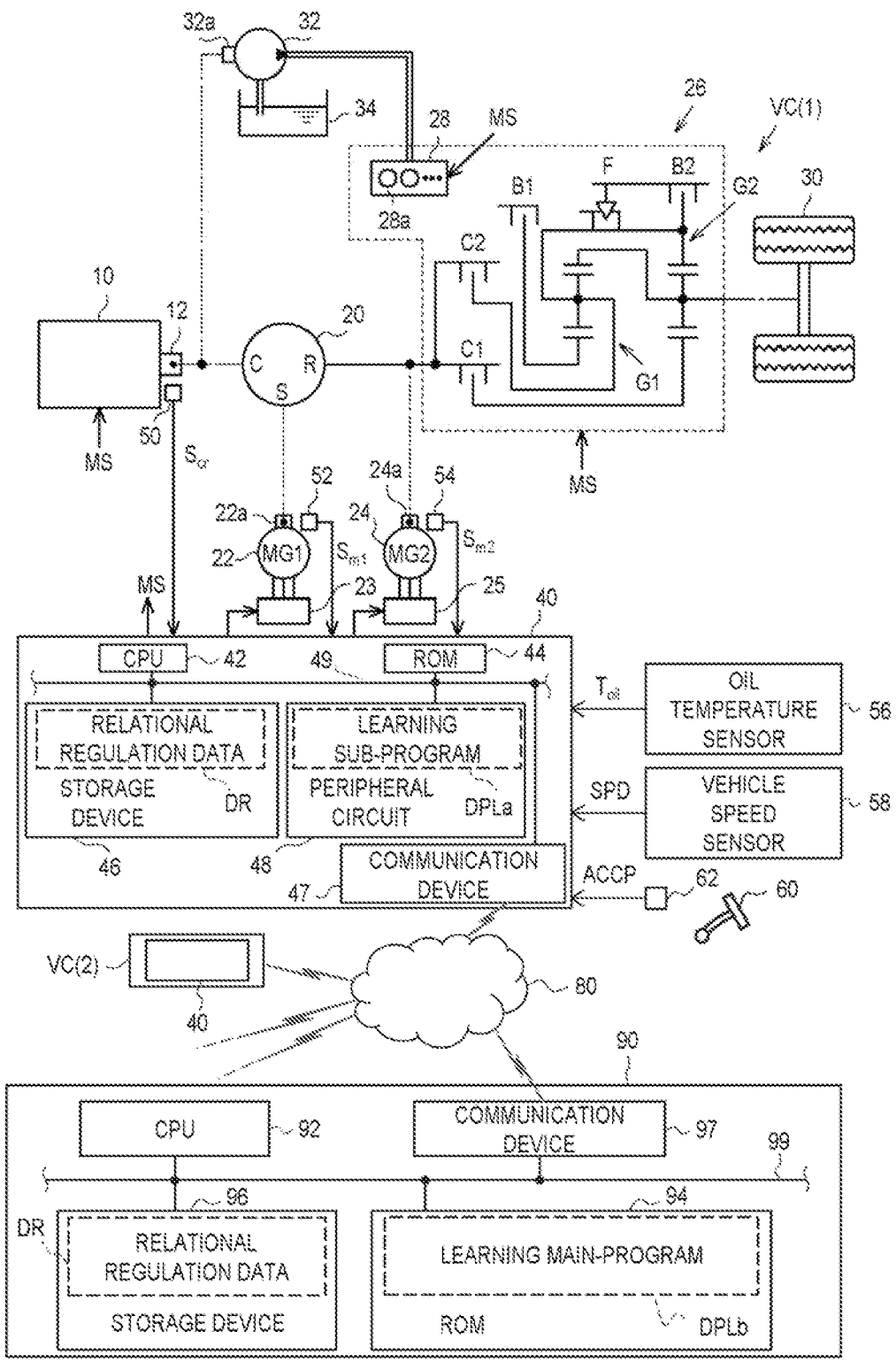
FIG. 6 is a diagram illustrating a configuration of a control system of an automatic transmission according to a third embodiment.

FIG. 6 illustrates a configuration of a system according to the third embodiment. In FIG. 6, parts corresponding to those illustrated in FIG. 1 are denoted by the same reference signs for convenience, and the description thereof will be omitted. As illustrated in FIG. 6, the control device 40 of the vehicle VC(1) includes a communication device 47 and can communicate with a data analysis center 90 via an external network 80 by the communication device 47.

The data analysis center 90 analyzes the data transmitted from a plurality of vehicles VC(1), VC(2), . . . . The data analysis center 90 includes a CPU 92, a ROM 94, a storage device 96, and a communication device 97. They can communicate with each other via internal buses 99. The storage device 96 is an electrically rewritable non-volatile device and stores the relational regulation data DR.

Figure 7:
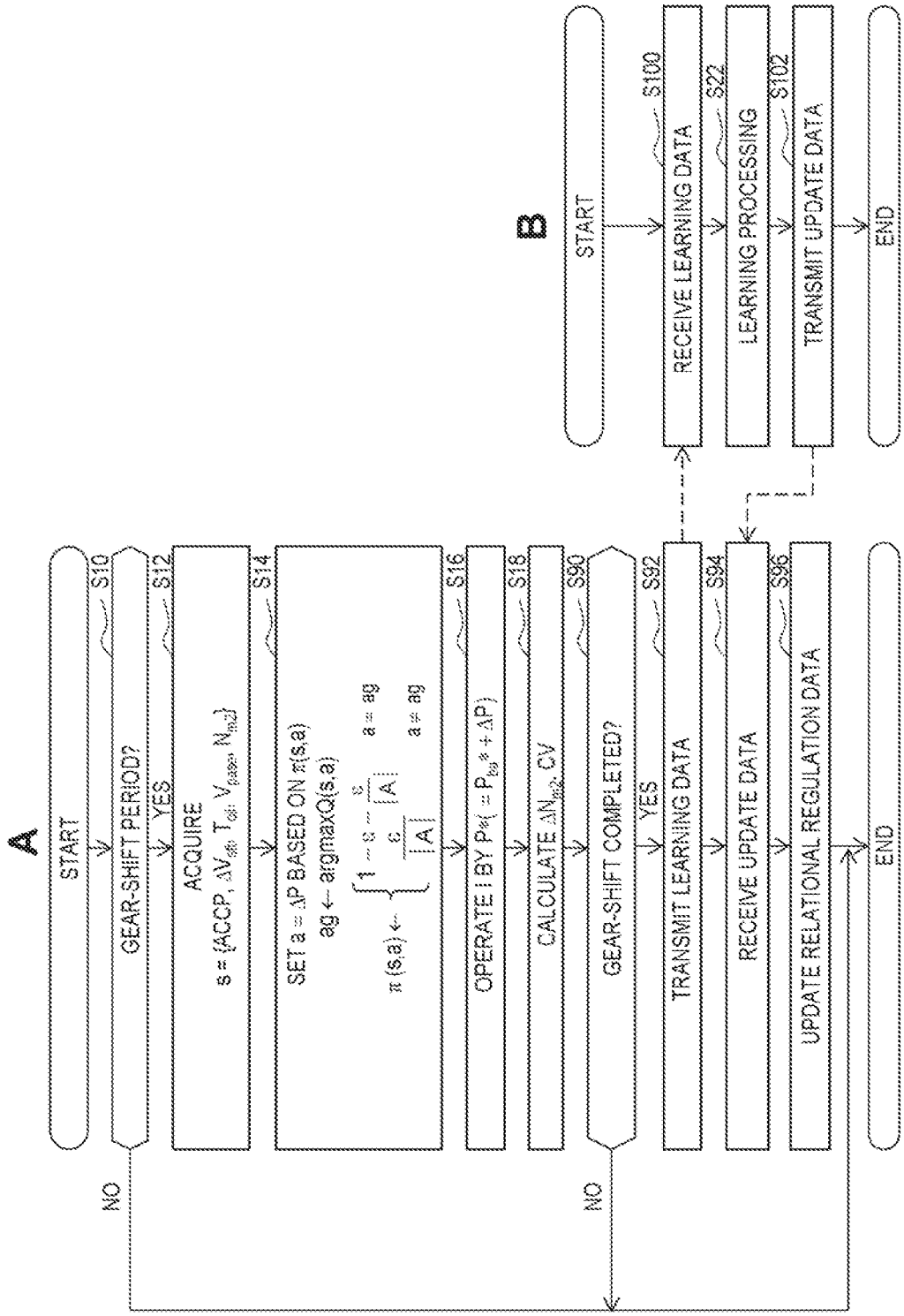
FIG. 7 shows flowcharts of A and B respectively illustrating procedures of processing executed by the control system.

FIG. 7 illustrates a processing procedure of the reinforcement learning according to the third embodiment. Processes illustrated in A of FIG. 7 are implemented when the CPU 42 executes a learning sub-program $DPL_a$ stored in the ROM 44 illustrated in FIG. 6. Further, processes illustrated in B of FIG. 7 are implemented when the CPU 92 executes a learning main-program $DPL_b$ stored in the ROM 94. In FIG. 7, for processes corresponding to those illustrated in FIG. 2, the same step numbers are assigned for convenience. Hereinbelow, along the time series of the reinforcement learning, the processing illustrated in FIG. 7 will be described.

In the series of processes illustrated in A of FIG. 7, upon first executing the processes of S10 to S18, the CPU 42 of the control device 40 determines whether the gear-shift has been completed (S90). Then, upon determining that the gear-shift has been completed (S90: YES), the CPU 42 operates the communication device 97 to transmit the data used for updating the relational regulation data DR by the reinforcement learning together with an identification code of the vehicle VC(1) (S92). This data includes the state s, the action a, the blow amount $\Delta N_{m2}$, the heat generation amount CV, or the like.

Meanwhile, as illustrated in B of FIG. 7, the CPU 92 of the data analysis center 90 receives the data for updating the relational regulation data DR (S100). Then, the CPU 92 executes a process of S22 based on the received data. Then, by operating the communication device 97, the CPU 92 transmits the data for updating the relational regulation data DR to a source from which the data received by the process of S100 is transmitted (S102). Upon completing the process of S102, the CPU 92 temporarily ends a series of processes illustrated in B of FIG. 7.

On the other hand, as illustrated in A of FIG. 7, the CPU 42 receives update data (S94). Then, the CPU 42 updates the relational regulation data DR used in the process of S14 based on the received data (S96). Upon completing the process of S96 or making a negative determination in the processes of S10 and S90, the CPU 42 temporarily ends the series of processes illustrated in A of FIG. 7. In addition, when re-executing the series of processes illustrated in A of FIG. 7 after making a negative determination in the process of S90, the CPU 42 does not newly update the action a by the processes S12 to S16 except when it is the start point of the phase. In other words, in that case, only the process of S18 is newly executed.

Next, an action and an advantageous effect of the third embodiment will be described. (3-1) According to the third embodiment, since the update process of the relational regulation data DR is executed outside the vehicle VC(1), a calculation load on the control device 40 can be reduced. In addition, for example, in the process of S100, when data from the vehicles VC(1), VC(2), . . . is received and the process of S22 is executed, the number of pieces of data used for the learning can be easily increased.

Correspondence Relation

The correspondence relation between the items in the embodiments and items described in the "SUMMARY" is as follows. The power source corresponds to the internal combustion engine 10, the first motor generator 22, and the second motor generator 24. The storage device corresponds to the storage device 46. The process for acquiring the state of the vehicle corresponds to the process of S12. The process for supplying the oil to the automatic transmission corresponds to the process of S16. The process for calculating, as the specific variable, at least one of the variables corresponds to the processes of S18, S32, S36, and S40. The process for calculating the reward corresponds to the processes of S34, S38, S42, and S48 of FIG. 3, or the processes of S34a, S38a, S42a, and S48 of FIG. 5. The process for updating the relational regulation data corresponds to the process of S50. The process for calculating the torque variable corresponds to the process of S60. The update mapping corresponds to the mapping designated by the command for executing the process of S50 in the learning program DPL. In other words, the update mapping corresponds to the mapping designated by the above equation (c1). A computer corresponds to the CPU 42 of FIG. 1 or to the CPUs 42, 92 of FIG. 6. The process for correcting the reward corresponds to the processes of S62 to S78. The control device corresponds to the control device 40. The execution device corresponds to the CPU 42 and the ROM 44 of FIG. 1, or to the CPUs 42, 92 and the ROMs 44, 94 of FIG. 6. The first execution device corresponds to the CPU 42 and the ROM 44, and the second execution device corresponds to the CPU 92 and the ROM 94.

OTHER EMBODIMENTS

Each of the above embodiments can be modified and implemented as follows. Each of the above embodiments and the following modified examples can be implemented in combination with each other within a range in which there are no technical inconsistencies.

About State Used for Selecting Value of Action Variable Based on Relational Regulation Data The state used for selecting the value of the action variable based on the relational regulation data is not limited to those exemplified in the above embodiments. For example, the state variables that depend on the values of the action variables before Phase 2 and Phase 3 do not have to include the detected rotation speed $N_{m2}$, and may include, for example, the blow amount $\Delta N_{m2}$. Further, for example, they may include the heat generation amount CV. However, for example, when a profit sharing algorithm as in a paragraph of "About Update Mapping" to be described below is used, the state variables that depend on the values of the action variables before Phase 2 and Phase 3 do not have to be included in the state used for selecting the values of the action variables.

About Acquisition Process

It is not necessary to include the accelerator operation amount ACCP in the state variable.

It is not necessary to include the oil temperature $T_{oil}$ in the state variable.

It is not necessary to include the phase variable $V_{pase}$ in the state variable. For example, the time from the start of the switching of the gear stages, the rotation speed of the input shaft, or the gear-shift variable $\Delta V_{sft}$ may be included in the state variable to constitute an action value function Q that designates each action, and the reinforcement learning may be executed using the same action value function. In that case, the gear-shift period is not specified as the three phases in advance.

About Action Variable

In the above embodiment, the correction value $\Delta P$ of the oil pressure command value P* is set as the action variable, but the action variable is not limited thereto, and may be the oil pressure command value P*, or, for example, a command value of the energizing current to the solenoid valve 28a or a rate of change of the command value.

About Relational Regulation Data

In the above embodiments, the action value function Q is set as the table-type function, but an applicable embodiment of the present disclosure is not limited thereto, and, for example, a function approximation device may be used.

For example, instead of using the action value function Q, the policy π may be expressed by a function approximation device that has the state s and the action a as independent variables and a probability of taking the action a as a dependent variable, and a parameter that determines the function approximation device may be updated according to the reward r.

About Specific Variable Calculation Process

The specific variable includes at least one of the values of the blow amount $\Delta N_{m2}$, the gear-shift time $T_{sft}$, and the heat generation amount InCV.

The specific variable does not have to be the blow amount $\Delta N_{m2}$ itself and may be, for example, a variable representing the magnitude of the blow amount $\Delta N_{m2}$. For example, the specific variable may be X" when the blow amount $\Delta N_{m2}$ is less than an allowable value, and "Y" when the blow amount $\Delta N_{m2}$ is equal to or greater than the allowable value. "Y" is different from "X". Further, the specific variable is not limited to the above examples and may be a variable divided into three or more levels. The same applies to other specific variables.

In addition to or instead of the heat generation amount InCV, a heat generation amount per unit time may be used as a specific variable. In this case, the heat generation amount per unit time is obtained by dividing the heat generation amount InCV by the gear-shift time $T_{sft}$.

About Engagement Process

As described in a paragraph of "About Relational Regulation Data", when the function approximation device is used as the action value function Q, by inputting the action a into the action value function Q together with the state s for each of the discrete values for the action that is the independent variable of the table-type function in the embodiments, the action a that maximizes the action value function Q is selected.

As described in the paragraph of "About Relational Regulation Data", when the policy π is expressed by the function approximation device that has the state s and the action a as the independent variables and the probability of taking the action a as the dependent variable, the action a is selected based on the probability represented by the policy π.

About Update Process

In each of the above embodiments, when the torque variable $TR_v$ is equal to or greater than the third predetermined value ΔT3, the update process is executed without changing the relational regulation data by setting the learning rate α to "0". However, when the torque variable $TR_v$ is equal to or greater than the third predetermined value ΔT3, the update process does not have to be executed. In this case, the relational regulation data is not changed by not executing the update process. Specifically, for example, in the first embodiment, when the torque variable $TR_v$ is equal to or greater than the third predetermined value ΔT3 (S74: NO), a series of processes may be ended without executing the process of S50.

On the other hand, when the torque variable $TR_v$ is less than the third predetermined value ΔT3, the larger the torque variable $TR_v$ is, the smaller the learning rate α may be set. The larger the torque variable $TR_v$ is, the smaller the amount updated by the update process can become.

About Update Mapping

In the process of S50, the so-called Q-learning, which is a policy-off type TD method, has been exemplified, but an applicable embodiment of the present disclosure is not limited thereto, and, for example, a so-called SARSA method, which is a policy-on type TD method, may be used. However, an applicable embodiment of the present disclosure is not limited to the TD method, and, for example, the Monte Carlo method or an eligibility tracing method may be used.

As the update mapping of the relational regulation data based on the reward, for example, a mapping according to the profit sharing algorithm may be used. More specifically, when an example using the mapping according to the profit sharing algorithm is used as a modified example of the process exemplified in FIG. 2, the following is executed. In other words, the reward is calculated at a stage where the gear-shift is completed. Then, the calculated reward is allocated to a rule that determines a pair of each state and action involved in the gear-shift according to a reinforcement function. Here, as the reinforcement function, for example, a well-known geometric decreasing function may be used. In particular, since the gear-shift time $T_{sft}$ has a strong correlation with the value of the action variable in Phase 3, it is effective to use the geometric decreasing function as the reinforcement function when distributing the reward according to the gear-shift time $T_{sft}$. However, the reinforcement function is not limited to the geometric decreasing function. For example, when the reward is assigned based on the heat generation amount CV, the distribution of the reward according to the heat generation amount CV to Phase 1 may be maximized in consideration of the fact that the heat generation amount CV has a strong correlation with the value of the action variable in Phase 1.

For example, as described in the paragraph of "About Relational Regulation Data", when the policy 7C is expressed by the function approximation device and it is directly updated based on the reward r, the update mapping is configured using a policy gradient method and the like.

The target to be directly updated by the reward r is not limited to only one of the action value function Q and the policy 7C. For example, the action value function Q and the policy 7C may be updated, respectively, as in an actor-critic method. Further, in the actor-critic method, for example, a value function V may become a target to be updated instead of the action value function Q.

About Reward Calculation Process

In the above embodiments, the reward r is set as zero in Phase 1 and Phase 2, but an applicable embodiment of the present disclosure is not limited thereto. For example, in Phase 1, a higher reward may be assigned when the heat generation amount CV in Phase 1 is small than when it is large. Further, for example, in Phase 2, a higher reward may be assigned when the heat generation amount CV in Phase 2 is small than when it is large. Further, for example, in Phase 2, a higher reward may be assigned when the blow amount $\Delta N_S$ in Phase 2 is small than when it is large.

The process for assigning a higher reward when a heat generation amount is small than when it is large is not limited to the process for assigning a higher reward when the heat generation amount InCV is small than when it is large. For example, a higher reward may be assigned when the maximum value of the heat generation amount CV per unit time within the gear-shift period is small than when it is large.

The variable representing the amount in which the rotation speed of the input shaft of the automatic transmission 26 exceeds the reference rotation speed is not limited to the maximum blow amount $\Delta N_{m2}$, and may be, for example, the average value of the blow amount $\Delta N_{m2}$ during the gear-shift period. Further, for example, it may be a variable in which an amount where a rotation speed of the input shaft when a gear-shift command is output exceeds the reference rotation speed is quantified.

In the above embodiments, the process for assigning a higher reward when the gear-shift time $T_{sft}$ is short than when it is long, the process for assigning a higher reward when an exceeding amount is small than when it is large, and the process for assigning a higher reward when the heat generation amount InCV is small than when it is large are executed, but an applicable embodiment of the present disclosure is not limited thereto. For example, for those three, only one of them may be executed, or, for example, only two of them may be executed.

In the processing of FIG. 5, even when the gear-shift time $T_{sft}$ is the same, the size of the reward r1 varies depending on the accelerator operation amount ACCP and the type of gear-shift, but an applicable embodiment of the present disclosure is not limited thereto. For example, it may not vary depending on the accelerator operation amount ACCP, but may vary depending on the type of gear-shift. Further, for example, it may not vary depending on the type of gear-shift, but may vary depending on the accelerator operation amount ACCP.

In the processing of FIG. 5, even when the maximum blow amount $\Delta N_{m2max}$ is the same, the size of the reward r2 varies depending on the accelerator operation amount ACCP and the type of gear-shift, but an applicable embodiment of the present disclosure is not limited thereto. For example, the size of the reward r2 may vary depending on the type of gear-shift, but does not have to vary depending on the accelerator operation amount ACCP. Further, for example, the size of the reward r2 may vary depending on the accelerator operation amount ACCP, but does not have to vary depending on the type of gear-shift.

In the processing of FIG. 5, even when the heat generation amount InCV is the same, the size of the reward r3 varies depending on the accelerator operation amount ACCP and the type of gear-shift, but an applicable embodiment of the present disclosure is not limited thereto. For example, the size of the reward r3 may vary depending on the type of gear-shift, but does not have to vary depending on the accelerator operation amount ACCP. Further, for example, the size of the reward r3 may vary depending on the accelerator operation amount ACCP, but does not have to vary depending on the type of gear-shift.

About Reward Amount Correction Process

In the above embodiment, when the torque variable $TR_v$ is less than the third predetermined value $\Delta T3$, the torque variable $TR_v$ is divided into three ranges and the larger the range of the torque variable $TR_v$ is, the smaller the reward r is stepwise corrected to be. However, the method of correcting the reward r is not limited to the example of the above embodiment. For example, when the torque variable $TR_v$ is less than the third predetermined value $\Delta T3$, the larger the torque variable $TR_v$ becomes, the smaller the reward r may be continuously corrected to be.

Further, when the torque variable $TR_v$ is less than the third predetermined value $\Delta T3$, the same reward may be assigned. As described above, it may be implemented that, by changing the setting of the learning rate $\alpha$, the larger the torque variable $TR_v$ is, the smaller the update amount is, and the same amount may be updated.

About Torque Variable Calculation Process

Figure 8:
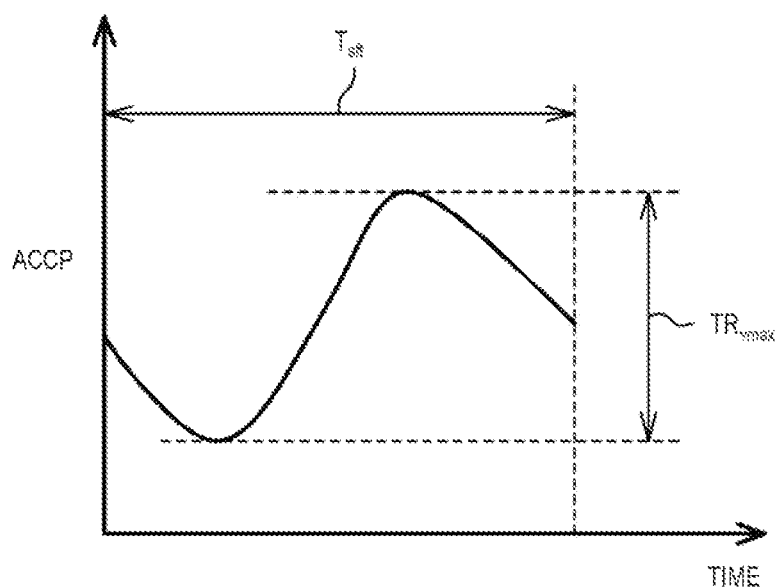
FIG. 8 is a diagram illustrating a torque variable in a modified example.

In each of the above embodiments, the torque variable $TR_S$ is not limited to the absolute value of a difference between the accelerator operation amount ACCP at the start of the switching of the gear stages and the accelerator operation amount ACCP at the completion of the switching of the gear stages. For example, as illustrated in FIG. 8, the absolute value of the difference between the maximum value and the minimum value of the accelerator operation amount ACCP during the gear-shift period may be calculated as a torque variable $TR_{vmax}$. In this case, the torque variable $TR_{vmax}$ can be detected by the maximum value and the minimum value of the accelerator operation amount ACCP during the gear-shift period. For this reason, even when the accelerator operation amount ACCP is changed from increasing to decreasing or from decreasing to increasing during the gear-shift period, the maximum amount of change in the accelerator operation amount ACCP can be calculated as the torque variable $TR_{vmax}$.

Figure 9:
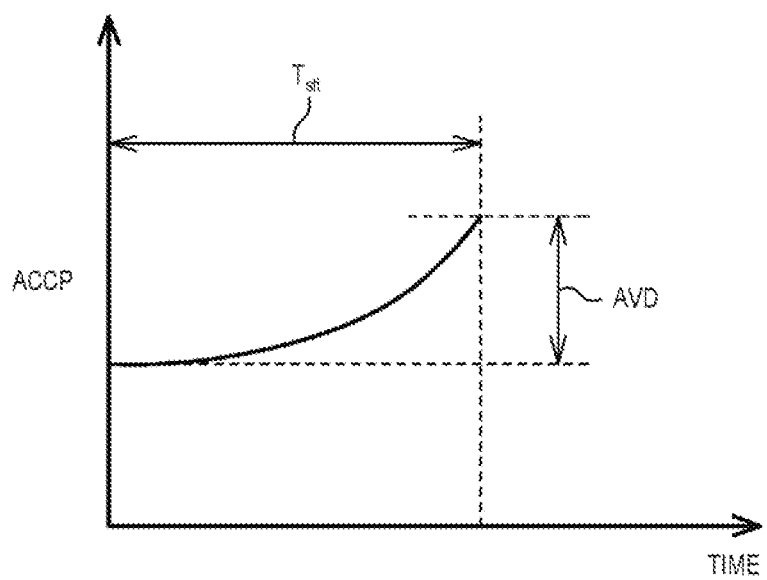
FIG. 9 is another diagram illustrating the torque variable in the modified example.

Further, as illustrated in FIG. 9, the torque variable may be calculated as a rate of change by dividing the absolute value AVD of the difference between the accelerator operation amount ACCP at the start of the switching of the gear stages and the accelerator operation amount ACCP at the completion of the switching of the gear stages by the gear-shift time $T_{sft}$. In this case, even when the amount of change in the accelerator operation amounts ACCP is the same, the torque variable can have different values depending on whether the gear-shift time $T_{sft}$ is long or short. In other words, the torque variable can be calculated as a rate of change in the accelerator operation amount ACCP per unit time. The torque variable is calculated as a value that is increased as the amount of change in the input torque is increased.

About Vehicle Control System

In the example illustrated in FIG. 7, the process for determining the action based on the policy $\pi$ (the process of S14) is executed on the vehicle side, but an applicable embodiment of the present disclosure is not limited thereto. For example, the data acquired by the process of S12 may be transmitted from the vehicle VC(1), the action a may be determined using the data transmitted at the data analysis center 90, and the determined action may be transmitted to the vehicle VC(1).

The vehicle control system is not limited to a system composed of the control device 40 and the data analysis center 90. For example, instead of the data analysis center 90, a user's mobile terminal may be used. Further, the vehicle control system may be composed of the control device 40, the data analysis center 90, and the mobile terminal. This can be implemented by, for example, executing the process of S14 by the mobile terminal.

About Execution Device

The execution device is not limited to including the CPU 42(92) and the ROM 44(94) and executing software processing. For example, a dedicated hardware circuit, such as an ASIC, which processes at least a part of the processes by software in the above embodiments by hardware may be provided. In other words, the execution device may have any of the following configurations (a) to (c). (a) A processing device, which executes all of the above processing according to a program, and a program storage device, such as a ROM, which stores the program, are provided. (b) A processing device, which executes a part of the above processing according to a program, a program storage device, and a dedicated hardware circuit, which executes the remaining processing, are provided. (c) A dedicated hardware circuit, which executes all of the above processing, is provided. Here, a plurality of software execution devices including a processing device and a program storage device, and a plurality of dedicated hardware circuits may be used.

About Computer

The type of computer is not limited to the CPU 42 of FIG. 1 or the CPUs 42, 92 of FIG. 6. For example, it may be a computer used for generating the relational regulation data DR before shipment of the vehicle VC(1) and the CPU 42 mounted on the vehicle VC(1). In that case, a search after the shipment may have a smaller range of values that can be taken by the action variable than a search in the reinforcement learning executed by a computer used for generating the relational regulation data DR. In addition, in the generation process of the relational regulation data DR before the shipment of the vehicle, the vehicle does not have to exist, and the state of the vehicle may be virtually generated by operating the internal combustion engine 10 or the like on a test bench and simulating traveling of the vehicle, and the state of the vehicle may be used for the reinforcement learning while grasping it virtually generated by the detection value of the sensor or the like. In that case, the virtually generated state of the vehicle is regarded as the state of the vehicle based on the detection value of the sensor.

About Storage Device

In the above embodiments, the storage device that stores the relational regulation data DR and the storage device (the ROM 44, 94) that stores the learning program DPL, the learning sub-program $DPL_a$, or the learning main-program $DPL_b$ are used as separate storage devices. However, it is not limited thereto.

About Vehicle

The vehicle is not limited to a series and parallel hybrid vehicle. For example, it may be a series hybrid vehicle or a parallel hybrid vehicle. As an in-vehicle rotating machine, the vehicle is not limited to including the internal combustion engine and the motor generator. For example, the vehicle may have the internal combustion engine but not the motor generator, or the vehicle may have the motor generator but not the internal combustion engine.

What is claimed is:

1. An oil pressure learning method of an automatic transmission, the automatic transmission being mounted on a vehicle, connected to a power source of the vehicle, and including at least one of a brake and a clutch as a friction engaging element, the oil pressure learning method comprising:
    acquiring a state of the vehicle in a state where a storage device stores relational regulation data used for regulating a relationship between the state of the vehicle and an oil pressure command value, which is a pressure of oil supplied to the automatic transmission when the friction engaging element that switches gear stages of the automatic transmission is engaged;
    supplying, when the friction engaging element that switches the gear stages of the automatic transmission is engaged, oil to the automatic transmission such that the value of the pressure of the supplied oil is set to the oil pressure command value determined by the acquired state of the vehicle and the relational regulation data;
    calculating, when the friction engaging element is engaged, as a specific variable, at least one of a variable representing an amount in which a detected input rotation speed of the automatic transmission exceeds a target input rotation speed of the automatic transmission, a variable representing a gear-shift time from a start of the switching of the gear stages to a completion of the switching, and a variable representing an amount of heat generated in the automatic transmission;
    calculating a reward in a manner in which the reward has a larger value when the calculated specific variable satisfies a criterion than when the calculated specific variable does not satisfy the criterion;
    updating the relational regulation data by inputting, to an update mapping determined in advance, the calculated reward and the oil pressure command value, the reward being calculated when the friction engaging element is engaged; and
    calculating a torque variable having a value that is increased as an amount of change in an input torque of the automatic transmission is increased when the friction engaging element is engaged, wherein:
        the update mapping outputs the relational regulation data that is updated to increase an expected profit for the reward when the friction engaging element is engaged according to the relational regulation data; and
        when the amount of change in the input torque represented by the calculated torque variable is equal to or greater than a predetermined value that is determined in advance, a change in the relational regulation data is regulated, the amount of change in the input torque being calculated when the friction engaging element is engaged.

2. The oil pressure learning method according to claim 1, wherein when the torque variable is less than the predetermined value, reward is corrected to have a smaller value as the torque variable is increased.

3. The oil pressure learning method according to claim 1, wherein:
    the update mapping includes a mapping that updates only an action value function by an updated amount having a value obtained by multiplying an action value function before the updating by a learning rate; and
    when the torque variable is equal to or greater than the predetermined value, the relational regulation data is updated with the learning rate set to "0".

4. The oil pressure learning method according to claim 1, wherein a different reward is assigned for each kind of the switching of the gear stages of the automatic transmission.

5. The oil pressure learning method according to claim 1, wherein the torque variable is a difference between an accelerator operation amount, which is an operation amount of an accelerator pedal at the start of the switching of the gear stages, and the accelerator operation amount of the accelerator pedal at the completion of the switching of the gear stages.

6. The oil pressure learning method according to claim 1, wherein the torque variable is a difference between a maximum value and a minimum value of an accelerator operation amount, which is an operation amount of an accelerator pedal during the gear-shift time from the start of the switching of the gear stages to the completion of the switching.

7. The oil pressure learning method according to claim 1, wherein the torque variable has a value obtained by dividing, into the gear-shift time, a difference between an accelerator operation amount, which is an operation amount of an accelerator pedal at the start of the switching of the gear stages, and the accelerator operation amount at the completion of the switching of the gear stages.

8. A control device of an automatic transmission, the automatic transmission being mounted on a vehicle, connected to a power source of the vehicle, and including at least one of a brake and a clutch as a friction engaging element, the control device comprising:

a storage device configured to store relational regulation data used for regulating a relationship between a state of the vehicle and an oil pressure command value, which is a pressure of oil supplied to the automatic transmission when the friction engaging element that switches gear stages of the automatic transmission is engaged; and an execution device configured to:
acquire the state of the vehicle;
supply, when the friction engaging element that switches the gear stages of the automatic transmission is engaged, oil to the automatic transmission such that the value of the pressure of the supplied oil is set to the oil pressure command value determined by the acquired state of the vehicle and the relational regulation data;
calculate, when the friction engaging element is engaged, as a specific variable, at least one of a variable representing an amount in which a detected input rotation speed of the automatic transmission exceeds a target input rotation speed of the automatic transmission, a variable representing a gear-shift time from a start of switching of the gear stages to a completion of the switching, and a variable representing an amount of heat generated in the automatic transmission;
calculate a reward in a manner in which the reward has a larger value when the calculated specific variable satisfies a criterion than when the calculated specific variable does not satisfy the criterion;
update the relational regulation data by inputting, to an update mapping determined in advance, the calculated reward and the oil pressure command value, the reward being calculated when the friction engaging element is engaged; and
calculate a torque variable having a value that is increased as an amount of change in an input torque of the automatic transmission is increased when the friction engaging element is engaged, wherein:
the update mapping outputs the relational regulation data that is updated to increase an expected profit for the reward when the friction engaging element is engaged according to the relational regulation data; and
the execution device is configured to, when the amount of change in the input torque represented by the calculated torque variable is equal to or greater than a predetermined value that is determined in advance, regulate a change in the relational regulation data, the amount of change in the input torque being calculated when the friction engaging element is engaged.

9. A control system of an automatic transmission, the automatic transmission being mounted on a vehicle, connected to a power source of the vehicle, and including at least one of a brake and a clutch as a friction engaging element, the control system comprising:
a storage device configured to store relational regulation data used for regulating a relationship between the state of the vehicle and an oil pressure command value, which is a pressure of oil supplied to the automatic transmission when the friction engaging element that switches gear stages of the automatic transmission is engaged;
a first execution device mounted on the vehicle; and
a second execution device, which is separate from the first execution device, wherein:
the first execution device is configured to:
acquire a state of the vehicle; and
supply, when the friction engaging element that switches the gear stages of the automatic transmission is engaged, oil to the automatic transmission such that the value of the pressure of the supplied oil is set to the oil pressure command value determined by the acquired state of the vehicle and the relational regulation data,
at least one of the first execution device and the second execution device is configured to:
calculate, when the friction engaging element is engaged, as a specific variable, at least one of a variable representing an amount in which a detected input rotation speed of the automatic transmission exceeds a target input rotation speed of the automatic transmission, a variable representing a gear-shift time from a start of switching of the gear stages to a completion of the switching, and a variable representing an amount of heat generated in the automatic transmission; and
calculate a reward in a manner in which the reward has a larger value when the calculated specific variable satisfies a criterion than when the calculated specific variable does not satisfy the criterion,
the second execution device is configured to update the relational regulation data by inputting, to an update mapping determined in advance, the calculated reward and the oil pressure command value, the calculated reward being calculated when the friction engaging element is engaged, and
at least one of the first execution device and the second execution device is configured to calculate a torque variable having a value that is increased as an amount of change in an input torque of the automatic transmission is increased when the friction engaging element is engaged, wherein:
the update mapping outputs the relational regulation data that is updated to increase an expected profit for the reward when the friction engaging element is engaged according to the relational regulation data; and
the second execution device is configured to, when the amount of change in the input torque represented by the calculated torque variable is equal to or greater than a predetermined value that is determined in advance, regulate a change in the relational regulation data, the amount of change in the input torque being calculated when the friction engaging element is engaged.

* * * * *